United States Patent

Watanabe et al.

[19]

[11] Patent Number: 6,083,444
[45] Date of Patent: Jul. 4, 2000

[54] METHOD FOR MOLDING AND VULCANIZING OF RUBBER

[75] Inventors: Shozo Watanabe; Keitaro Kameyama, both of Chiba-ken, Japan

[73] Assignee: Kinugawa Rubber Industrial Co., Ltd., Japan

[21] Appl. No.: 08/076,475

[22] Filed: Jun. 14, 1993

Related U.S. Application Data

[63] Continuation of application No. 07/533,504, Jun. 5, 1990.

[30] Foreign Application Priority Data

Jun. 5, 1989 [JP] Japan .................................. 1-142650

[51] Int. Cl.$^7$ .................................................. B29C 71/00
[52] U.S. Cl. .......................... 264/236; 264/320; 264/907; 264/345; 264/494
[58] Field of Search ................................ 264/26, 25, 22, 264/494, 236, 320, 407, 345; 156/325, 327

[56] References Cited

U.S. PATENT DOCUMENTS

| | | | |
|---|---|---|---|
| 2,611,152 | 9/1952 | Seifreid | 264/24 |
| 2,966,469 | 12/1960 | Smythe et al. | 264/25 |
| 3,989,790 | 11/1976 | Bruner et al. | |
| 4,481,159 | 11/1984 | Itoh | 264/26 |
| 4,776,915 | 10/1988 | Natori et al. | 264/26 |
| 4,868,769 | 9/1989 | Persson | 264/40.1 |
| 4,980,384 | 12/1990 | Takahashi et al. | 264/25 |
| 4,994,222 | 2/1991 | Iizumi et al. | 264/25 |
| 5,084,219 | 1/1992 | Sigur | 264/25 |

FOREIGN PATENT DOCUMENTS

| | | |
|---|---|---|
| 896247 | 11/1953 | Germany . |
| 896553 | 11/1953 | Germany . |

OTHER PUBLICATIONS

Encyclopedia of Polymer Science and Technology, "Dielectric Heating". vol. 5, 1986 at table 1, p. 5.

*Primary Examiner*—Merrick Dixon
*Attorney, Agent, or Firm*—Bachman & LaPointe, P.C.

[57] ABSTRACT

A method for molding a rubber compound concurrently with vulcanizing thereof utilizing the technique of high or very high frequency dielectric heating. An apparatus for molding the rubber compound concurrently with vulcanizing thereof is composed of a high voltage power source, a vacuum tube where electric waves are generated, a pair of electrode plates, and a mold having, sulfur corrosion resistance. The power source, vacuum tube and electrodes plates are electrically interconnected. The mold is attached to the electrode plates and holds the rubber compound. The rubber compound is formed of a rubber material and other constituents to raise the value of dielectric loss factor of the rubber to more than 0.20. The waves generated are determined in the HF (high-frequency) or VHF (very high-frequency) band range for effectively carrying out dielectric heating.

10 Claims, 1 Drawing Sheet

METHOD FOR MOLDING AND VULCANIZING OF RUBBER

This is a continuation of co-pending application Ser. No. 533,504 filed on Jun. 5, 1990.

BACKGROUND OF THE INVENTION

1. Field of the Invention

The present invention relates to a method for molding and vulcanizing rubber. More specifically, the present invention relates to a method for vulcanizing a rubber compound concurrently with molding thereof utilizing high frequency or very high frequency dielectric heating.

2. Description of the Prior Art

Generally, natural rubber (NR) and compound rubber such as styrene butadiene rubber (SBR), isobutylene isoprene rubber (TIR), nitrile butadiene rubber (NBR), isoprene rubber (IR), chloroprene rubber (CR) and etylene propylene copolymer (EPDM) have been utilized widely in various fields because of their elasticity, flexibility and gas and/or liquid sealing properties. Typically, the elastic properties of rubber are highly increased by the vulcanization technique. For vulcanization of rubber, there are various methods in the field which require heat treatment of the rubber at 120 to 200° C. for a predetermined duration. However, the heating is time consuming because the thermal conductivity of rubber is very low. Therefore, dielectric heating which maintains high energy efficiency by utilizing a material's exothermic properties has been applied to vulcanization.

Dielectric heating is based on dielectric loss caused by the movement of dielectric polarized molecules in an electric field, according to Van der Waals force therebetween. When utilizing this method, dielectrics are heated uniformly and rapidly from within, generating heat by themselves. As is well known in the art, watts per $cm^3$ of material (Pv) generated per unit volume at a unit duration is defined by the following formula;

$$Pv = 5/9 f\epsilon' \tan \delta E^2 \times 10^{-12} (W/cm^3) \qquad (1)$$

wherein f : frequency,
$\epsilon'$ : constant,
tan δ : dielectric dissipation factor
E : electrode voltage or the magnitude of the field strength.

As shown in the above formula (1), Pv is directly proportional to the dielectric loss factor which is represented as a product of the dielectric constant and the dissipation factor, i.e., $\epsilon'$ tan δ, the frequency f, and the square of field strength.

Generally, NR and rubber compounds as previously mentioned have low dielectric loss factor ($\epsilon$ tan δ) as shown in the following Table 1.

TABLE 1

| | Dielectric loss factor of rubber | | |
|---|---|---|---|
| | $\epsilon'$ at 20° C. | tanδ in 1MHz | $\epsilon'$ tanδ |
| NR | 2.0 | 0.003 | 0.006 |
| SBR | 2.0 | 0.003 | 0.006 |
| IIR | 2.0 | 0.001 | 0.002 |
| NBR | 2.0 | 0.0005 | 0.001 |
| IR | 2.0 | 0.002 | 0.004 |

TABLE 1-continued

| | Dielectric loss factor of rubber | | |
|---|---|---|---|
| | $\epsilon'$ at 20° C. | tanδ in 1MHz | $\epsilon'$ tanδ |
| EPDM | 2.0 | 0.0005 | 0.001 |
| CR | 2.0 | 0.03 | 0.09 |

It is clear from the formula (1), that f or E must be high in order to increase the temperature for heating. However, generating sufficiently high field strength (E) causes frequent discharging in an apparatus and causes safety problems and also lacks operational simplicity.

Taking all the above into consideration, microwave dielectric heating at ultra high frequencies (UHF) has been applied for vulcanizing rubber.

Japanese Patent First Publication (Tokkai) No.54-152082 and Japanese Patent First Publication No.56-4925 disclose methods for vulcanizing rubber which is compounded of exothermic agents which utilize microwave dielectric heating at 2450 MHz; (a UHF frequency). As previously mentioned, rubber compounds, when vulcanized have a relatively low dielectric loss of $\epsilon$ tan δ, so the frequency (2450 MHz) is determined for inducing exothermic reaction. Exothermic agents, such as carbon black are blended in the rubber in order to promote the exothermic reaction. Typical methods of microwave dielectric heating are used in both disclosures. Microwaves generated in a magnetron generator are irradiated on the rubber compound located in an applicator through an waveguide. Thus, the rubber maybe heated sufficiently for vulcanization by microwave irradiation.

However, in the prior constructions, the rubber cannot be molded easily in the applicator during irradiation. Therefore, vulcanizing and molding must be done separately, requiring two steps. This increases manufacturing cost and complexity as well as requiring additional time for molding.

SUMMARY OF THE INVENTION

It is therefore the principal object of the present invention to provide a method for molding and vulcanizing rubber utilizing dielectric heating techniques at relatively lower frequencies than the prior art without the necessity of direct irradiation.

It is another object of the present invention to provide a method for molding rubber concurrently with vulcanization.

It is an additional object of the present invention to provide an apparatus having a simple construction for molding rubber concurrently with vulcanization.

It is a further object of the present invention to provide a composition for a rubber compound which is optimally suited for exothermic reaction under conditions of dielectric heating.

In the present invention, a method for vulcanizing and molding a rubber compound is composed of the following steps, i.e., the steps of providing a molding means with a heating means, supplying the rubber compound in the molding means, performing dielectric heating for vulcanizing the rubber compound simultaneously with molding thereof commonly utilizing the heating means. The molding and vulcanizing may be carried out concurrently.

A method for molding a rubber compound concurrently with vulcanizing is composed of the following steps, i.e., the steps of preparing the rubber compound having a dielectric loss factor of more than 0.20, applying the rubber compound to a molding means having sulfur corrosion resistance, the molding means attached to an inner surface of one of a pair of electrode plates, pressing the rubber compound held in the molding means between the electrode plates, supplying electric power within a predetermined frequency range to the electrode plates, and carrying out dielectric heating to vulcanize the rubber compound concurrently with molding thereof.

The compound may includes 5 parts by weight of alkylene glycol with 30 parts by weight of chlorinated rubber to 100 parts by weight of a rubber material.

The molding means may be formed off fluorine or silicon resin.

The frequency supplied to the electrode plates may be determined at a value of less than 100 MHz, or more preferably, at a value of 40 MHz. Alternatively, the frequency may be determined in the HF (high-frequency) or VHF (very high-frequency) band range.

An apparatus for molding a rubber compound concurrently with vulcanizing is composed of a high voltage power source, a vacuum tube to generate electric waves, a pair of eloctrode plates, the power source, vacuum tube and electrode plates being electrically interconnected, a molding means having a low dielectric loss factor, attached to an inner surface of one of the electrode plates, the molding means further having sulfur corrosion resistance.

According to the present invention, as the composition of the rubber compound is determined so as to raise the dielectric loss coefficient up to the value of more than 0.20, the rubber compound can be vulcanized under the frequency of less than 100 MHz. Therefore, the technique of the high frequency or very high frequency dielectric heating can be applied to the vulcanization, then the electric power can be 5 supplied through the lead path and the electrode plates without direct irradiation, the molding means for molding the rubber can be attached directly to the plates. Thus, the molding of the rubber can be accomplished concurrently with vulcanizing thereof. When using the above apparatus, construction of the apparatus can be simplified and required steps for molding the rubber can be reduced to one step, therefore labor intensiveness can be improved. Furthermore, time for molding can be improved and manufacturing cost can be reduced.

BRIEF DESCRIPTION OF THE DRAWING

The present invention will be understood from the detailed description given hereinbelow and from the accompanying drawing of the preferred embodiment which is given for explanation and understanding only and is not intended to imply limitation to the invention.

In the drawing.

DETAILED DESCRIPTION OF THE PREFERRED EMBODIMENT

Figure 1:
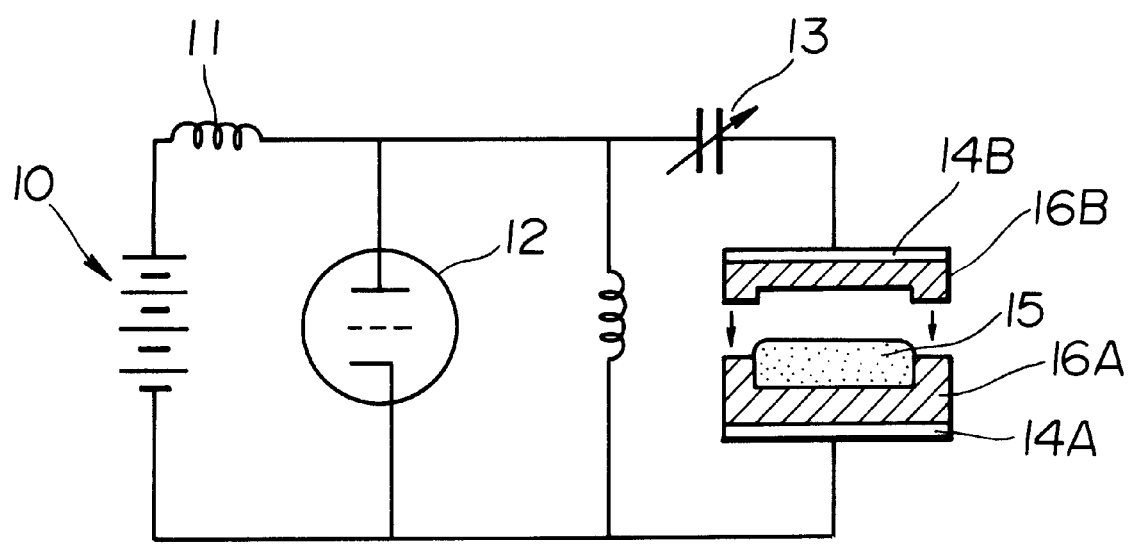
FIG. 1 is a representative circuit schematic for an apparatus for molding and vulcanizing rubber according to the present invention.

For the purpose of solving the above-mentioned problems, high frequency or very high frequency dielectric heating techniques are applied for molding and vulcanizing the rubber, taking advantage of the characteristic arrangements therefore, i.e., the rubber is placed between two electrode plates and high frequency or very high frequency is applied to the rubber through lead path and the electrode plates. In this arrangement, molding means can be attached to the electrode plates directly, then molding can be accomplished concurrently with vulcanization.

FIG. 1 shows a schematic circuit of an apparatus for high frequency or very high frequency dielectric heating. Referring now to FIG. 1, the numeral 10 generally designates a high voltage power source, numeral 11 designates a choke means. High or very high frequency waves are generated by a vacuum tube 12 which acts as a generator and, through a matching device 13, the waves are supplied to a pair of electrode plates 14A and 14B. A rubber compound 15 to be molded and vulcanized is located between a lower die cavity 16A and an upper die cavity 16B attached directly to inner surfaces of the electrode plates 14A and 14B, respectively. The lower and upper die cavities 16A and 16B are formed of such as silicon or fluorine resins. A concave portion is formed in the lower die cavity 16A so as to hold the rubber 15. Concurrently with carrying out high frequency dielectric heating, both die cavities 16A and 16B are brought into contact with each other and pressurized, thus press molding the rubber compound is carried out while vulcanizing.

However, there is certain problem in the above method. Dielectric loss in the rubber compound to be vulcanized is relatively low, as previously shown in Table 1. Therefore, from Table 1 and the formula (1), the frequency required can not be in a range of less than 100 MHz, theoretically.

The heat quantity (H) required for increasing the rubber's temperature up to $\Delta T$ °C. is indicated in following formula (2);

$$H = SC\Delta T \text{(cal)} \tag{2}$$

wherein, S: specific gravity of the rubber compound,
C: specific heat thereof,

An output (W) required for the high frequency power source to increase the temperature up to $\Delta T$ °C. during t seconds is indicated in following formula (3):

$$W = 4.186 SC\Delta T/t \text{(watt)} \tag{3}$$

previously indicated in the formula (1) is also indicated in following formula (4):

$$Pv = W/Ad \tag{4}$$

wherein, A: surface area of the compounded rubber
d: distance between the electrodes Assuming the voltage between the electrodes is determined 5 KV/cm, the frequency required can be calculated by the following substitute formula (5), obtained from the formula (1) and (4):

$$f = \frac{Pv}{0.556 \epsilon' \tan\delta \times 25 \times 10^6 \times 10^{-12}} \text{ (Hz)} \tag{5}$$

For example, in the case of vulcanizing a rubber compound containing NR, if the specific gravity thereof is 1.1, the specific heat is 0.45, and the dielectric loss factor $\epsilon'$ tan $\delta = 0.012$, the required frequency to raise the temperature of the rubber up to 200° C. during 5 seconds can be calculated by the above formula (5) as follows;

$$f = \frac{83}{0.556 \times 0.012 \times 23 \times 10^6 \times 10^{-12}} = 497 \text{ (Hz)}$$

Theoretically, from the above result, in the case of an NR compound (or other rubber compound such as SBR, IIR, NBR, IR, EPDM or CR), having conventional composition, exothermic reaction can not occur by dielectric heating at a frequency of less than 100 MHz.

EXAMPLE 1

Various rubber compounds having conventional composition were vulcanized using high frequency dielectric heating at a frequency of 40 MHz. The vulcanizing was carried out utilizing the apparatus previously described and shown in FIG. 1. The obtained results are shown in the following Table 2.

TABLE 2

Relationship between Composition of the Rubber Compound and Vulcanization

| Sample No. | | 1 | 2 | 3 | 4 | 5 | 6 | 7 |
|---|---|---|---|---|---|---|---|---|
| Material Rubber | NR | 100 | | | | | | |
| | SBR | | 100 | | | | | |
| | IIR | | | 100 | | | | |
| | NBR | | | | 100 | | | |
| | IR | | | | | 100 | | |
| | EPDM | | | | | | 100 | |
| | CR | | | | | | | 100 |
| Zinc White | | 5 | 5 | 5 | 5 | 5 | 5 | 5 |
| Stearic Acid | | 1 | 1 | 1 | 1 | 1 | 1 | 1 |
| Carbon Black | | 40 | 40 | 40 | 40 | 40 | 40 | 40 |
| Filler | | 30 | 30 | 30 | 30 | 30 | 30 | 30 |
| Softener | | 40 | 40 | 40 | 40 | 40 | 40 | 40 |
| Sulfur | | 2 | 2 | 2 | 2 | 2 | 2 | 2 |
| Magnesium Oxide | | | | | | | | 5 |
| Vulcanization-Accelerator | DM | 0.5 | 0.5 | 0.5 | 0.5 | 0.5 | 0.5 | |
| | TT | 0.2 | 0.2 | 0.2 | 0.2 | 0.2 | 0.2 | |
| | 22 | | | | | | | 0.2 |
| Sum | | 218.7 | 218.7 | 218.7 | 218.7 | 218.7 | 218.7 | 223.2 |
| $\epsilon'$ at 20° C. | | 3.0 | 3.0 | 3.0 | 3.0 | 3.0 | 3.0 | 4.0 |
| tan δ in 1 MHz | | 0.004 | 0.005 | 0.005 | 0.004 | 0.005 | 0.005 | 0.03 |
| $\epsilon'$ tanδ | | 0.012 | 0.015 | 0.015 | 0.012 | 0.015 | 0.015 | 0.12 |
| Exothermic Vulcanization | | x | x | x | x | x | x | x |

From the above, it may be clearly understood that rubber compounds having conventional composition can not be vulcanized at frequencies of 40 MHz.

Theoretically, the dielectric constant, the dielectric dissipation factor, and the dielectric loss factor required to accomplish high frequency dielectric heating at a frequency less than 100 MHz are preferably determined at $\epsilon'$=4.0, tan δ=0.05, and $\epsilon'$ tan δ=0.20, respectively. In order to obtain the above values, various experiments for obtaining preferable compositions of rubber have been performed by the present inventors. A composition of alkylene glycol and chlorinated rubber was discovered which exhibits preferable characteristics suitable to the method of the invention.

EXAMPLE 2

Various rubber compounds having preferred compositions as described above were vulcanized using high frequency dielectric heating at a frequency of 40 MHz. Vulcanizing was carried out utilizing the apparatus previously described and shown in FIG. 1. The obtained results are shown in the following Table 3.

TABLE 3

Relationship between Composition of the Rubber Compound and Vulcanization

| Sample No. | | 8 | 9 | 10 | 11 | 12 | 13 | 14 |
|---|---|---|---|---|---|---|---|---|
| Material Rubber | NR | 100 | | | | | | |
| | SBR | | 100 | | | | | |
| | IIR | | | 100 | | | | |
| | NBR | | | | 100 | | | |
| | IR | | | | | 100 | | |
| | EPDM | | | | | | 100 | |
| | CR | | | | | | | 100 |
| Zinc White | | 5 | 5 | 5 | 5 | 5 | 5 | 5 |
| Stearic Acid | | 1 | 1 | 1 | 1 | 1 | 1 | 1 |
| Carbon Black | | 40 | 40 | 40 | 40 | 40 | 40 | 40 |
| Filler | | 30 | 30 | 30 | 30 | 30 | 30 | 30 |
| Alkylene Glycol | | 5 | 5 | 5 | 5 | 5 | 5 | 5 |
| Chlorinated Rubber | | 30 | 30 | 30 | 30 | 30 | 30 | 30 |
| Softener | | 40 | 40 | 40 | 40 | 40 | 40 | 40 |
| Sulfur | | 2 | 2 | 2 | 2 | 2 | 2 | 2 |
| Magnesium Oxide | | | | | | | | 5 |
| Vulcanization-Accelerator | DM | 0.5 | 0.5 | 0.5 | 0.5 | 0.5 | 0.5 | |
| | TT | 0.2 | 0.2 | 0.2 | 0.2 | 0.2 | 0.2 | |
| | 22 | | | | | | | 0.2 |
| Sum | | 253.7 | 253.7 | 253.7 | 253.7 | 253.7 | 253.7 | 256.2 |
| $\epsilon'$ at 20° C. | | 4.0 | 4.0 | 4.0 | 4.0 | 4.0 | 4.0 | 4.0 |
| tan δ in 1 MHz | | 0.06 | 0.06 | 0.06 | 0.06 | 0.06 | 0.06 | 0.05 |
| $\epsilon'$ tanδ | | 0.24 | 0.24 | 0.24 | 0.24 | 0.24 | 0.24 | 0.20 |
| Exothermic Vulcanization | | o | o | o | o | o | o | o |

It is clear that incorporation of 5 parts by weight of alkylene glyool with 30 parts by weight of chlorinated rubber to 100 parts by weight of rubber material can raise the values of $\epsilon$ and tan δ. Therefore, the value of the dielectric loss factor, i.e., $\epsilon'$ tan δ can also be increased. As shown in Table 3, when subjecting a rubber compound having composition as in Table 3 to high frequency dielectric heating, vulcanization is well accomplished utilizing the apparatus shown in FIG. 1. Thus, according to the above composition and the construction of the apparatus as described, molding of rubber can be suitably accomplished while vulcanizing. Therefore, molding and vulcanizing can be reduced to a single step, and, as the result, manufacturing costa and time can be reduced.

While the present invention has been disclosed in terms of the preferred embodiment in order to facilitate better understanding thereof, it should be appreciated that the invention can be embodied in various ways without departing from the principles thereof. For example, in the apparatus of the present invention, while the molding means is formed of fluorine or silicon resins in the description, the molding means may alternatively be formed of any materials having a low dielectric loss factor, and sulfur corrosion resistance. Additionally, various compositions of the rubber compound may be utilized which enables the dielectric loss factor to reach a value of more than 0.20. Furthermore, frequencies in the range of 10 to 100 MHz, HF or VHF area can be used for molding and vulcanization even though the frequency value of 40 MHz was used in the above-mentioned example.

Therefore, the invention should be understood to include all possible embodiments and modifications to shown embodiments which can be embodied without departing from the principles of the invention as set out in the appended claims.

What is claimed is:

1. A method for vulcanizing and molding a rubber compound comprising the steps of:
providing a mold formed of a single material, said mold cooperating with a pair of electrode plates holding said mold therebetween,
providing a rubber compound having a dielectric loss factor regulated to a value of more than 0.20, said rubber compound including at least one component selected from the group consisting of alkylene glycol, chlorinated rubber and mixtures thereof,
supplying said rubber compound into said mold, and
pressuring said mold and performing dielectric heating under frequency in a range of 10 to 100 MHz for vulcanizing said rubber compound concurrently with molding thereof to a rubber article having a desired volume, wherein said heating is directly applied to said mold via said electrode plates.

2. The method for molding a rubber compound as set forth in claim 1, wherein said mold is formed of fluorine resin.

3. The method for molding a rubber compound as set forth in claim 1, wherein said mold is formed of silicon resin.

4. A method for vulcanizing and molding a rubber compound comprising the steps of:
providing a mold formed of a single material, said mold cooperating with a pair of electrode plates holding said mold therebetween,
providing a rubber compound having a dielectric loss factor regulated to a value of more than 0.02, said rubber compound incorporating 5 parts by weight of alkylene glycol with 30 parts by weight of chlorinated rubber to 100 parts by weight of a rubber material,
supplying said rubber compound into said mold, and
pressuring said mold and performing dielectric heating under frequency in a range of 10 to 100 MHz for vulcanizing said rubber compound concurrently with molding thereof to a rubber article having a desired volume, wherein said heating is directly applied to said mold via said electrode plates.

5. A method for molding a rubber compound concurrently with vulcanizing comprising the steps of:
providing a rubber compound wherein the dielectric loss factor thereof is regulated to more than 0.20, said rubber compound including at least one component selected from the group consisting of alkylene glycol, chlorinated rubber and mixtures thereof,
applying said rubber compound to a mold including a first portion and a second portion separable from each other wherein both portions are formed of a single material having sulfur corrosion resistance, said portions attached to inner surfaces of a pair of electrode plates, respectively, and
pressurizing said rubber compound and supplying electric power under frequency in a range of 10 to 100 MHz directly to said electrode plates for carrying out dielectric heating to vulcanize said rubber compound concurrently with molding thereof to a rubber article having a desired volume.

6. The method for molding a rubber compound as set forth in claim 5, wherein said mold is formed of fluorine resin.

7. The method for molding a rubber compound as set forth in claim 5, wherein said mold is formed of silicon resin.

8. A method for molding a rubber compound concurrently with vulcanizing comprising the steps of:
providing a rubber compound wherein the dielectric loss factor thereof is regulated to more than 0.20, said rubber compound incorporating 5 parts by weight of alkylene glycol with 30 parts by weight of chlorinated rubber to 100 parts by weight of a rubber material,
applying said rubber compound to a mold including a first portion and a second portion separable from each other wherein both portions are formed of a single material having sulfur corrosion resistance, said portions attached to inner surfaces of a pair of electrode plates, respectively, and
pressurizing said rubber compound and supplying electric power under frequency in a range of 10 to 100 MHz directly to said electrode plates for carrying out dielectric heating to vulcanize said rubber compound concurrently with molding thereof to a rubber article having a desired volume.

9. A method for molding a rubber compound concurrently with vulcanizing comprising the steps of:
providing a mold formed of a single material, said mold cooperating with a pair of electrode plates holding said mold therebetween,
providing a rubber compound having a dielectric loss factor more than 0.20, wherein said rubber compound incorporates 5 parts by weight of alkylene glycol with 30 parts by weight of chlorinated rubber to 100 parts by weight of a rubber material,
supplying said rubber compound into said mold, and performing dielectric heating at a frequency in a range of 10 to 100 MHz for vulcanizing said rubber compound concurrently with molding thereof to a rubber article having a desired volume, wherein said heating is directly applied to said mold via said electrode plates.

10. A method for molding a rubber compound concurrently with vulcanizing comprising the steps of:
providing a rubber compound having a dielectric loss factor more than 0.20, wherein said rubber compound incorporates 5 parts by weight alkylene glycol with 30 parts by weight of chlorinated rubber into 100 parts by weight of a rubber material,
applying said rubber compound to a mold including a first portion and a second portion separable from each other wherein both portions are formed of a single material having sulfur corrosion resistance, said portions attached to inner surfaces of a pair of electrode plates, respectively, and
pressurizing said rubber compound and supplying electric power at a frequency in a range of 10 to 100 MHz directly to said electrode plates for carrying out dielectric heating to vulcanize said rubber compound concurrently with molding thereof to a rubber article having a desired volume.

* * * * *